United States Patent [19]

Widener

[11] Patent Number: 5,022,142

[45] Date of Patent: Jun. 11, 1991

[54] APPARATUS AND METHOD FOR LOADING PELLETS INTO FUEL RODS

[75] Inventor: Wade H. Widener, Cayce, S.C.

[73] Assignee: Westinghouse Electric Corp., Pittsburgh, Pa.

[21] Appl. No.: 839,485

[22] Filed: Mar. 14, 1986

[51] Int. Cl.$^5$ .............................................. B23P 19/00
[52] U.S. Cl. ...................................... 29/723; 29/464; 29/706; 29/710; 29/727; 29/821; 198/769
[58] Field of Search ............. 29/723, 727, 726, 706, 29/710, 429, 464, 400 N, 51, 821; 221/156, 200, 202; 53/525, 244, 497, 77, 258; 198/769

[56] References Cited

U.S. PATENT DOCUMENTS

| | | | |
|---|---|---|---|
| 3,120,888 | 2/1964 | Piel | 221/156 |
| 3,223,490 | 12/1965 | Sacken et al. | 221/200 |
| 3,940,908 | 3/1976 | Dazen et al. | 53/497 |
| 3,965,648 | 6/1976 | Tedesco | 198/769 |
| 4,235,066 | 11/1980 | King et al. | 29/723 |
| 4,243,078 | 1/1981 | Sahlin . | |
| 4,292,788 | 10/1981 | King . | |

FOREIGN PATENT DOCUMENTS 0058192 5/1979 Japan .................. 29/400 N

*Primary Examiner*—P. W. Echols
*Assistant Examiner*—I. Cuda

[57] ABSTRACT

An apparatus for loading cylindrical fuel pellets into tubular fuel rods includes pellet segregation means for detecting and segregating an undersized pellet prior to its entry into a fuel rod. The segregation means includes a pair of laterally separated guide rails adapted to support the lateral side edges of the advancing pellets, and such that a pellet of undersized diameter will drop to a level below that of the properly sized pellets. A lateral shoulder is positioned at the downstream end of the guide rails for engaging and holding any dropped pellet so that it cannot advance into the fuel rod. Also, a pellet deflecting plate is positioned at the upstream end of the guide rails, to interrupt the contact between adjacent pellets and thus assure that an undersized pellet is not carried along the guide rails by the adjacent pellets.

7 Claims, 2 Drawing Sheets

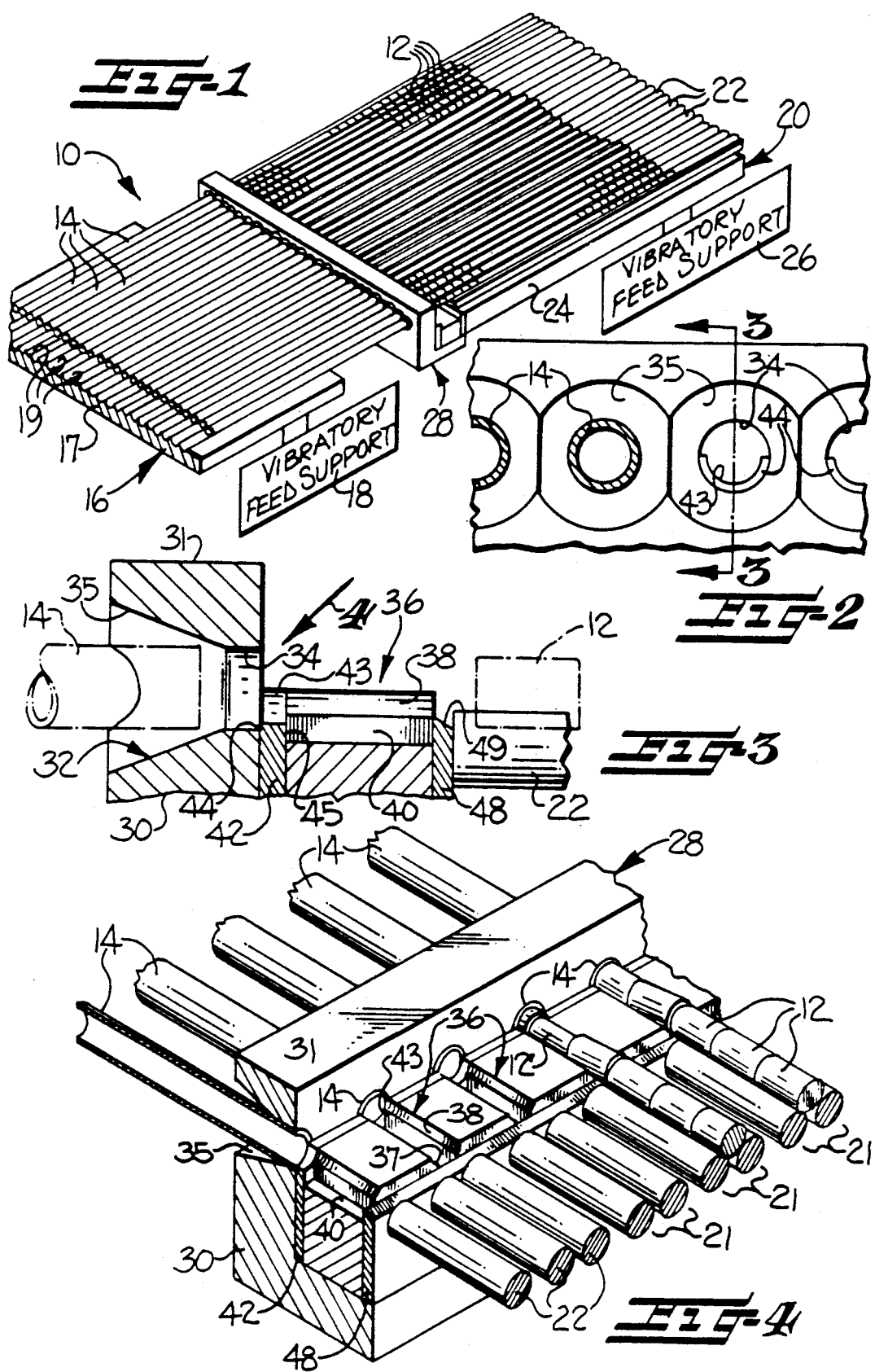

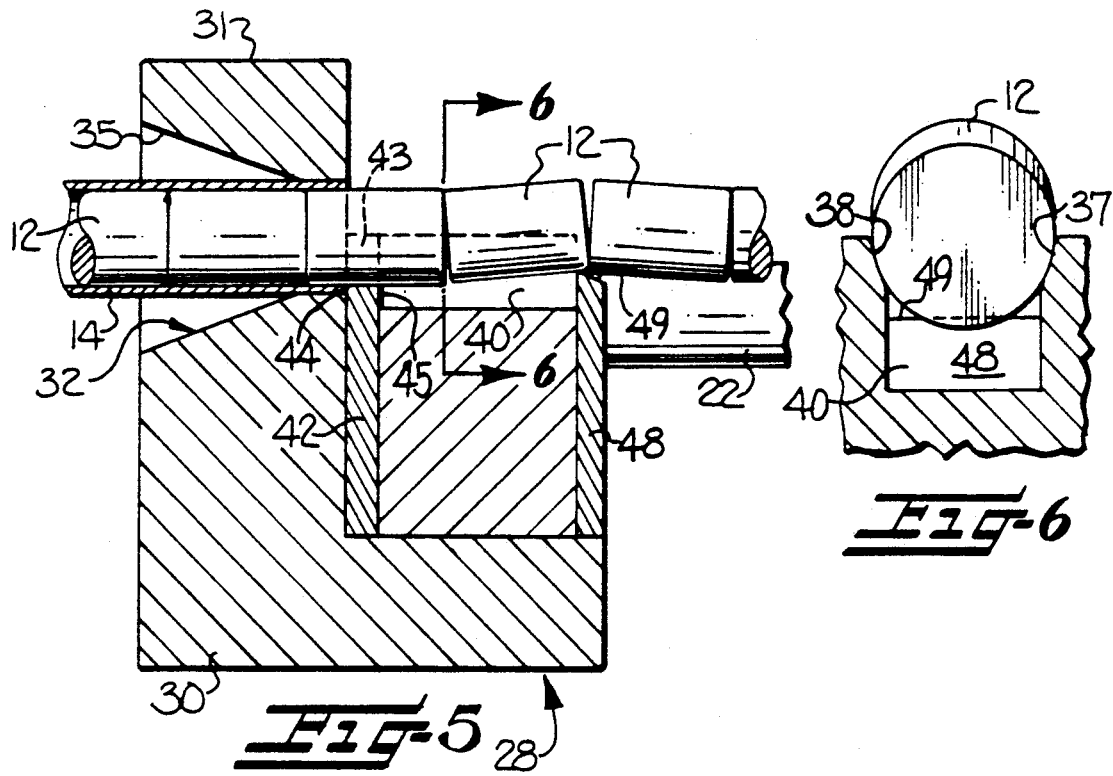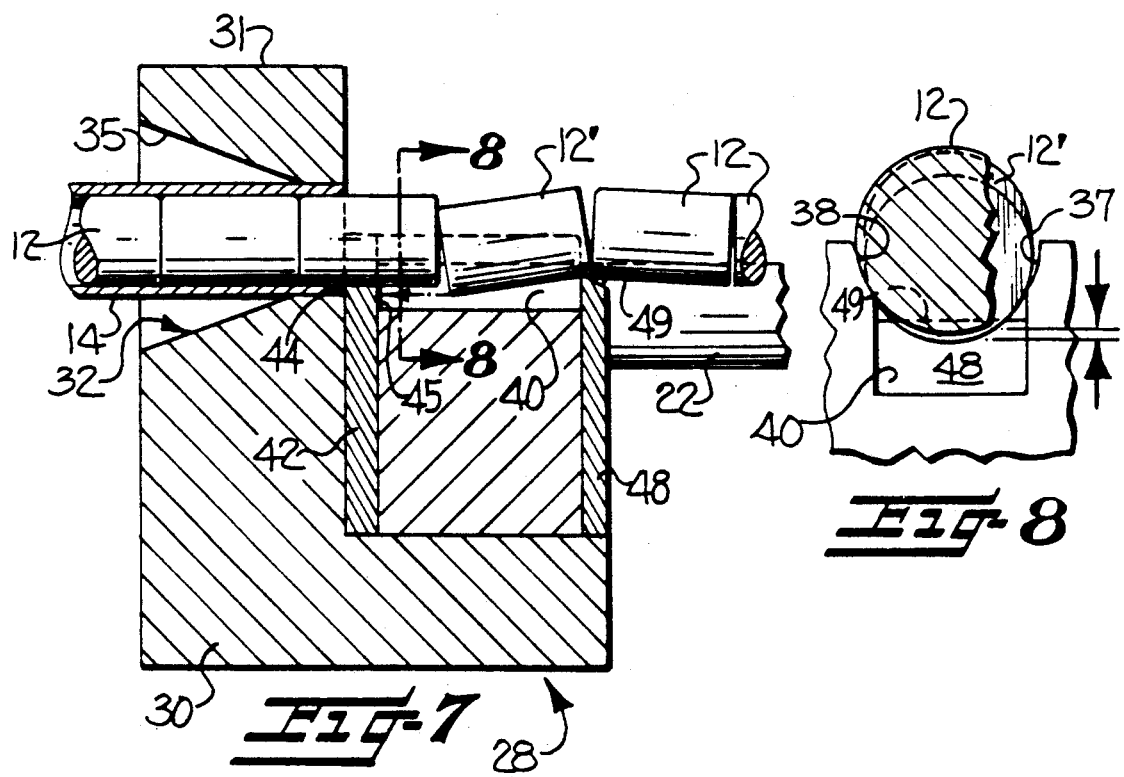

APPARATUS AND METHOD FOR LOADING PELLETS INTO FUEL RODS

BACKGROUND OF THE INVENTION

1. Field of the Invention

The present invention relates to an apparatus and method for loading pellets into fuel rods of the type adapted for use in nuclear reactors, and more particularly to an apparatus and method which also identifies undersized pellets and precludes the loading of such undersized pellets into the fuel rods.

2. Description of the Prior Art

Commercial nuclear reactors of the type designed for the generation of electrical power utilize several fuel assemblies, each composed of a large number of fuel rods. Each of the rods in turn contains about 240 fuel pellets, which serve to generate heat during reactor operation.

According to prior practices, the pellets were manually inserted into the fuel rods, by utilizing various stands and tables which support the rods in a fixed position relative to a tray containing a number of columns of fuel pellets. Each column was accurately aligned longitudinally with the open end of its associated fuel rod, and the operator then manually pushed a number of columns of pellets into the rods. The tray was then replaced with a new supply of pellets, and the process repeated until each rod was full. More recently, the pellets have been loaded utilizing vibratory feed tables, note for example the prior patent to Dazen et al, U.S. Pat. No. 3,940,908, and the patent to Tedesco, U.S. Pat. No. 3,965,648.

It is also recognized in the art that the fuel pellets utilized in the fuel rods of a nuclear power generator must be maintained within close size tolerances, since an improperly sized pellet will heat to a nonuniform temperature. While pellet manufacturers employ numerous checks during the manufacturing process to detect improperly sized pellets, it is believed to be possible that an improperly sized pellet could escape detection during manufacture. Any such failure would be particularly acute in the case of a pellet of undersized diameter, since an undersized pellet can be loaded into the rod without difficulty, and thus without being detected during the loading operation.

It is accordingly an object of the present invention to provide an apparatus and method for identifying an undersized cylindrical pellet in an advancing column of pellets.

It is a more particular object of the present invention to provide an apparatus and method which is adapted to detect and segregate an undersized fuel pellet in a column of longitudinally advancing pellets being loaded into a fuel rod adapted for use in a nuclear reactor, and wherein an undersized pellet will be detected and segregated prior to its being loaded into the rod, to thereby provide further assurance that an undersize pellet will not be loaded into the rod.

SUMMARY OF THE INVENTION

The above and other objects and advantages of the present invention are achieved in the embodiment illustrated herein by the provision of an apparatus and method which comprises guide surface means adapted for supporting a plurality of serially arranged and longitudinally oriented cylindrical pellets, and such that the pellets are adapted to be slideably and longitudinally advanced along the guide surface means to define an advancing column of pellets. In addition, pellet segregation means is positioned adjacent one end of the guide surface means for permitting each advancing pellet having a cross sectional diameter equal to a predetermined minimum diameter to advance thereacross while permitting each advancinng pellet having a cross-sectional diameter less than the predetermined minimum diameter to drop to a level below the level of the remaining pellets in the advancing column. The pellet segregation means also includes means for precluding the further longitudinal advance of each such dropped pellet and the trailing pellets in the column.

The pellet segregation means preferably comprises a pair of laterally separated and longitudinally extending parallel guide rails adapted to support the advancing column of pellets therebetween, with the guide rails being laterally separated a predetermined distance so as to support each pellet having the predetermined minimum diameter, while permitting a pellet of undersize diameter to drop therebetween. It is also preferred that the pellet segregation means further comprises pellet deflecting means disposed adjacent the upstream end of the guide rails, for upsetting the longitudinal alignment of the pellets as they are advanced onto the guide rails, to thereby interrupt the contact between adjacent pellets and thus assure that an undersized pellet is unsupported by the adjacent pellets as it passes along the guide rails.

The apparatus of the present invention further preferably includes rod support means for supporting a plurality of fuel rods in a laterally aligned and parallel arrangement, with a like number of the guide surface means positioned adjacent one end of the rod support means for supporting a like member of longitudinal columns of fuel pellets. A transition guide means, which includes the pellet segregation means as described above, is positioned between the rod support means and the adjacent end of the guide surface means for guiding the advancing columns of pellets into respective ones of the rods, while identifying and segregating an undersized pellet in the manner described above.

BRIEF DESCRIPTION OF THE DRAWINGS

Some of the objects and advantages of the present invention having been stated, others will appear as the description proceeds when taken in conjunction with the accompanying drawings, in which FIG. 1 is a schematic perspective view of a pellet loading apparatus which embodies the features of the present invention;

FIG. 2 is an enlarged fragmentary end view of the transition guide means of the apparatus shown in FIG. 1;

FIG. 3 is a sectional view taken substantially along the line 3—3 of FIG. 2;

FIG. 4 is a fragmentary perspective view, partly sectioned, of the transition guide means of the apparatus shown in FIG. 1;

FIG. 5 is a view similar to FIG. 3, and illustrating the manner in which pellets of proper size pass across the pellet segregation means;

FIG. 6 is a sectional view taken substantially along the line 6—6 of FIG. 5 in slightly enlarged scale; and FIGS. 7 and 8 correspond to FIGS. 5 and 6 respectively, but illustrate the manner in which an undersized pellet drops below the level of the remaining pellets during passage across the segregation means.

DETAILED DESCRIPTION OF THE PREFERRED EMBODIMENT

Referring more particularly to the drawings, FIG. 1 schematically illustrates a fuel pellet loading apparatus 10, which embodies the features of the present invention. The apparatus 10 is specifically adapted for loading cylindrical fuel pellets 12 into tubular fuel rods 14, and as illustrated, the apparatus 10 comprises rod support means 16 for supporting a plurality of fuel rods 14 in a laterally aligned, parallel arrangement. The rod support means 16 includes a table 17 supported by a vibratory feed support 18 of conventional design, and which is adapted to impart a reciprocatory movement to the table 17 for advancing the pellets 12 into and through the rods 14 in the manner further described in the above cited prior patents. The upper surface of the table 17 may include semi-circular grooves 19 for receiving and supporting the rods, and suitable clamps (not shown) may be provided for holding the rods in proper position on the table during the loading procedure.

The apparatus 10 further includes pellet support means 20 positioned adjacent one end of the rod support means 16, for supporting a plurality of longitudinal columns of fuel pellets disposed in an end to end arrangement, and with the columns being longitudinally aligned with respective ones of the fuel rods on the rod support means. The pellet support means 20 includes a plurality of laterally aligned guide surface means 21, with each guide surface means 21 being adapted to support a plurality of serially arranged and longitudinally oriented cylindrical pellets. More particularly, each guide surface means 21 includes a pair of laterally aligned cylindrical bars 22, note FIG. 4, which are laterally spaced apart a predetermined distance so as to be adapted to support a column of pellets therebetween. The bars 22 are mounted on a supporting frame 24, which also includes a vibratory feed support 26 for advancing the columns of pellets toward the fuel rods, i.e. toward the left as seen in FIG. 1.

In accordance with the present invention, a transition guide means 28 is mounted between the pellet support means 20 and the rod support means 16, and which serves to guide the pellets into the fuel rods. In addition, the transition guide means 28 is adapted to detect and segregate any pellet having a cross sectional diameter less than a predetermined minimum, and to preclude the further longitudinal advance of such undersized pellet and the trailing pellets in the same column. The transition guide means 28 comprises a block 30 which extends laterally between the table 17 and pellet support bars 22, and the block includes an upstanding leg 31 having a number of bores 32 therethrough, with each of the bores being adapted to receive the end of one of the fuel rods 14 as best seen in FIGS. 3 and 4. More particularly, each bore 32 includes a cylindrical portion 34 adapted to closely receive the outside diameter of the fuel rod, and an outer conical portion 35 which is adapted to facilitate the receipt of the rod therein.

On the upstream side of the upstanding leg 31 of the block, there is disposed pellet segregation means 36 which includes a pair of laterally separated guide rails 37, 38 associated with each of the bores 32. Each pair of guide rails 37, 38 is aligned between the associated bore 32 and the space between the associated guide bars 22. Also, the rails have a predetermined lateral separation so as to engage and support the lateral side edges of the pellets passing therealong. In addition, the guide rails 37, 38 each have an arcuate curvature in cross section, so as to define a circle matching the outside cross section of the pellets, and which has its center aligned with the center of the pellets moving therealong, and such that a properly sized pellet is supported at the same elevation as it is supported by the associated bars 22. The area between and below the guide rails 37, 38 is open, to define a pellet receiving chamber 40 for the purposes further described below.

The pellet segregation means also includes a plate 42 positioned at the downstream end of the guide rails 37, 38, and which is also positioned parallel to and in contact with the upstream side of the leg 31 of the block 30. As best seen in FIG. 4, the upper edge of the plate 42 includes a number of arcuate notches 43, which are longitudinally aligned with respective ones of the guide rails 37, 38 and the associated bore 32 through the leg. In addition, the notches 43 define a circle which corresponds to the inside circumference of the fuel rods 14, and thus the plate 42 closes the lower portion of the bore 32 when viewed in the longitudinal direction from the rod support table 17, note FIG. 2, and the plate 42 thus forms an arcuate abutment 44 at the upstream end of the bore 32 for engaging the end of the fuel rod and supporting the rod at a predetermined longitudinal position. The opposite face of the plate defines a shoulder 45 for engaging undersize pellets as further described below.

At the upstream end of the guide rails 37, 38 there is positioned a pellet deflecting plate 48, which is disposed parallel to the plate 42. The deflecting plate 48 includes a straight upper edge which lies at an elevation sufficient to contact the lower front edge of each pellet as it advances from the bars 22 to the guide rails 37, 38. The plate 48 also includes an inclined front surface 49 in cross section, note for example FIG. 3, so as to lift the pellets as best seen in FIGS. 5 and 7, thereby upsetting the longitudinal alignment of the pellets as they are advanced onto the guide rails 37, 38 from the bars 22, and to thereby interrupt the contact between adjacent pellets.

In operation, the fuel rods 14 are initially positioned on the table 17, with the forward ends of the rods inserted into the associated bores 32, and in contact with the associated abutment 44 of the plate 42. A number of columns of pellets are then loaded on the bars 22 of the pellet support means 20, with the number of columns of pellets corresponding to the number of fuel rods to be loaded. The vibratory feed supports 18 and 26 are then activated, causing the columns of fuel pellets to advance along the bars 22, across the pellet deflecting plate 48, along the guide rails 37, 38 and into the fuel rods 14. The vibration imparted to the rods 14 causes the pellets to continue to advance along the length of the rods, to permit them to be fully loaded.

With properly sized pellets, the pellets move across the deflecting plate 48 and guide rails 37, 38 in the manner seen in FIGS. 5-6. However, in the case of a pellet having a cross sectional diameter less than a predetermined minimum, the lateral spacing of the guide rails will permit the pellet to drop at least partially into the chamber 40 so that it is held at an elevation below the level of the remaining pellets, note FIGS. 7 and 8, which illustrate an undersized and dropped pellet at 12'. The dropped pellet 12' will then engage the shoulder 45 of the plate 42 at the downstream end of the guide rails 37, 38, which precludes its further advance, as well as the advance of the trailing pellets in the same column. The machine operator is thus able to readily detect the presence of an undersized pellet 12' before it enters the fuel rod 14, and it may be readily removed and replaced with a properly sized pellet.

In view of the fact that the pellets engage each other in an end to end arrangement during their advance, it is possible that an undersized pellet could be supported by its adjacent pellets as it moves across the guide rails 37, 38 to thereby preclude its dropping into the chamber 40.. However, in accordance with the present invention, this contingency is effectively avoided, in that the pellet deflecting plate 48 serves to upset the longitudinal alignment of all of the pellets as they enter upon the guide rails. Thus any supportive contact from the adjacent pellets is broken, thereby assuring that an undersize pellet is free to drop into the chamber 40 in the manner shown in FIGS. 7 and 8.

In the drawings and specification, there has been set forth a preferred embodiment of the invention, and although specific terms are employed, they are used in a generic and descriptive sense only and not for purposes of limitation.

I claim as my invention:

1. An apparatus for feeding a column of aligned cylindrical pellets along a longitudinal path of travel and while identifying a pellet of improper size, and comprising
   guide surface means adapted for supporting a plurality of serially arranged and longitudinally oriented cylindrical pellets, and such that the pellets are adapted to be slideably and longitudinally advanced along said guide surface means to define an advancing column of pellets, and
   pellet segregation means positioned adjacent one end of said guide surface means for permitting each advancing pellet having a cross-sectional diameter equal to a predetermined minimum diameter to advance thereacross while permitting each advancing pellet having a cross-sectional diameter less than the predetermined minimum diameter to drop to a level below the level of the remaining pellets in the advancing column, said pellet segregation means including a pair of laterally separated and longitudinally extending parallel guide rails adapted to support the advancing stream of pellets therebetween, and with the guide rails being laterally separated a predetermined distance so as to support each pellet of said predetermined minimum diameter while permitting a pellet of undersize diameter to drop therebetween to a level below the level of the remaining pellets in the column, and further including lateral shoulder means for precluding the further longitudinal advance of each such dropped pellet and the trailing pellets in the associated column, said lateral shoulder means being disposed adjacent and below the downstream end of said guide rails and at a level such that the advancing pellets of predetermined minimum diameter pass freely above said shoulder means while any undersize pellet which was dropped below the level of the remaining pellets is engaged by said shoulder means.

2. The apparatus as defined in claim 1 wherein said pellet segregation means further comprises pellet deflecting means disposed adjacent the upstream end of said guide rails for upsetting the longitudinal alignment of said pellets as they are advanced onto said guide rails to thereby interrupt the contact between adjacent pellets and thus assure that any undersize pellets are unsupported by the adjacent pellets as they pass along said guide rails.

3. An apparatus for loading cylindrical fuel pellets into tubular fuel rods which are adapted for use in a nuclear reactor, and comprising
   rod support means for supporting a plurality of tubular fuel rods in a laterally aligned arrangement,
   pellet support means positioned adjacent one end of said rod support means for supporting a plurality of longitudinal columns of fuel pellets, with the columns being longitudinally aligned with respective ones of the rods on said rod support means, said pellet support means including guide surface means for each of said columns which is adapted for supporting a plurality of serially arranged and longitudinally oriented cylindrical pellets, and such that the pellets are adapted to be slideably and longitudinally advanced along said guide surface means to define an advancing column of pellets, and
   transition guide means positioned between said pellet support means and said rod support means for guiding the advancing columns of pellets into respective ones of said rods, said transition guide means including pellet segregation means disposed adjacent the end of each of said guide surface means for permitting each advancing pellet having a cross-sectional diameter equal to a predetermined minimum diameter to advance thereacross while permitting each advancing pellet having a cross-sectional diameter less than the predetermined minimum diameter to drop to a level below the level of the remaining pellets in the advancing column, each of said pellet segregation means including a pair of laterally separated and longitudinally extending parallel guide rails adapted to support the advancing column of pellets therebetween, and with the guide rails being laterally separated a predetermined distance so as to support each pellet of said predetermined minimum diameter while permitting a pellet of undersize diameter to drop therebetween to a level below the level of the remaining pellets in the column, and further including lateral shoulder means for precluding the further longitudinal advance of each such dropped pellet and the trailing pellets in the associated column, said lateral shoulder means being disposed adjacent and below the downstream end of said guide rails and at a level such that the advancing pellets of predetermined minimum diameter pass freely above said shoulder means while any undersize pellet which has dropped below the level of the remaining pellets is engaged by said shoulder means.

4. The apparatus as defined in claim 3 wherein said transition guide means further includes means for supporting the end of each fuel rod positioned on said rod support means, in a fixed longitudinal position and in alignment with the associated pellet segregation means.

5. The apparatus as defined in claim 4 wherein said means for supporting the end of each fuel rod includes abutment means adapted for longitudinally abutting the end of each of said rods so as to maintain the ends of the rods in a laterally aligned relationship with respect to each other.

6. The apparatus as defined in claim 5 further comprising means for feeding the pellets on said pellet support means longitudinally across said transition guide means and into respective ones of said fuel rods positioned on said rod support means.

7. The apparatus as defined in claim 3 wherein each of said pellet segregation means further comprises pellet deflecting means disposed adjacent the upstream end of said guide rails for upsetting the longitudinal alignment of said pellets as they are advanced onto said guide rails to thereby interrupt the contact between adjacent pellets and thus assure that any undersize pellets are unsupported by the adjacent pellets as they pass along said guide rails.

* * * * *